No. 713,427. Patented Nov. 11, 1902.
W. N. GOURLEY.
DIE FOR WELDING LINKS.
(Application filed July 15, 1902.)
(No Model.)
Fig. 1.
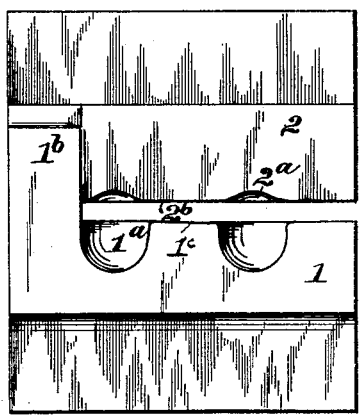
Fig. 2.
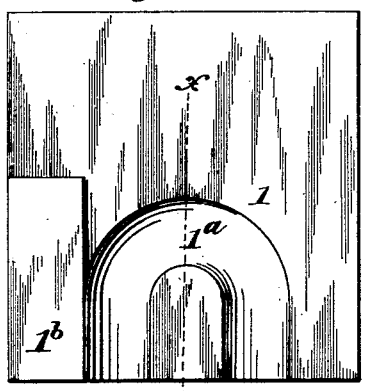
Fig. 3.
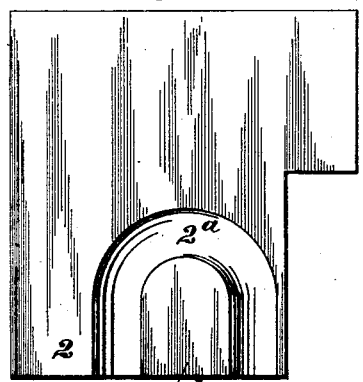
Fig. 5.
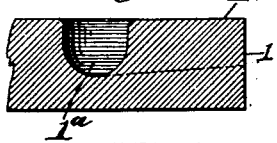
Fig. 4.
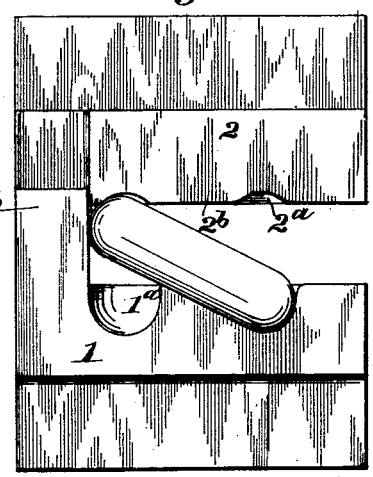
Fig. 6.
Fig. 7.
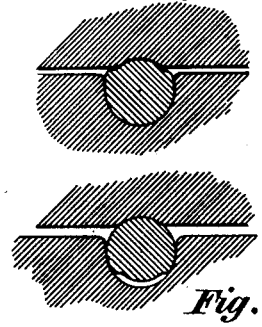
WITNESSES:
Jesse Pratt
O. D. Howard
INVENTOR
William N. Gourley
BY Finckel & Finckel
his ATTORNEYS
THE NORRIS PETERS CO., PHOTO-LITHO., WASHINGTON, D. C.

UNITED STATES PATENT OFFICE.

WILLIAM N. GOURLEY, OF COLUMBUS, OHIO.

DIE FOR WELDING LINKS.

SPECIFICATION forming part of Letters Patent No. 713,427, dated November 11, 1902.

Application filed July 15, 1902. Serial No. 115,644. (No model.)

*To all whom it may concern:*

Be it known that I, WILLIAM N. GOURLEY, a citizen of the United States, residing at Columbus, in the county of Franklin and State of Ohio, have invented certain new and useful Improvements in Dies for Welding Links; and I do hereby declare the following to be a full, clear, and exact description of the invention, such as will enable others skilled in the art to which it appertains to make and use the same.

The object of this invention is to provide improved dies for facilitating the welding and shaping of chain-links.

Where the links are welded in a deep female die by the action of a male die that enters the female die, the link must be quite accurately shaped before it is placed in the female die; otherwise the male die when it descends is sure to cut and jag the link. Moreover, when the male die enters the female die fins or sharp angles are almost certain to be formed on the link.

My invention consists in the form of the parts of the die, as hereinafter described and claimed.

In the accompanying drawings, Figure 1 shows a front view of the two members. Fig. 2 is a plan view of the upper face of the lower member. Fig. 3 is a plan view of the lower face of the upper member. Fig. 4 is a front view showing how a link a little too wide is placed to be acted on. Fig. 5 is a sectional view on the plane $x\ x$, Fig. 2. Fig. 6 shows in section how one heavy blow may shape the link-bar, and Fig. 7 shows the link-bar turned over to remove to a large extent by a light blow the irregularity occasioned by a heavy blow.

In the several views 1 designates the lower or anvil-die block. This is provided in its upper face with a groove or recess $1^a$ of the ordinary U shape of the end of the link to be welded and of the depth approximately two-thirds the diameter of the bar of metal of which the link is constructed, the surface of said groove $1^a$ being in a plane substantially coinciding with the plane of the upper surface of the die proper; but in welding links the scarfed ends are lapped, so that the link is a little heavier or thicker at the welded end. To prevent the metal from squeezing up into the sides of the die-groove, the groove is made a trifle deeper at the end, as indicated in Fig. 5. Moreover, it is desirable that the link be a trifle thicker at the welded end to give it strength at that place. The lower member has rising vertically from its side a projection or wall $1^b$, the face of which coincides with, is tangent to, and blends with the wall of the link-shaping groove. When, therefore, a link that is a trifle too wide is placed at one side in the remote side of the shaping-groove and its other side placed against the face of the projection $1^b$, the descending upper or hammer die will squeeze the link down into the groove, imparting to the link the proper lateral dimensions and shape.

2 designates the upper or hammer die. This has a very shallow groove $2^a$, with a flat surface $2^b$ between the sides, so as not to possibly enter the lower die. The upper die is not intended to play a large part in the shaping operation, its function being mainly to press the link into the lower die, and the slightly-rounded shape of the groove is more to prevent alteration or flattening of the already-shaped link rather than to give a rounded shape. The upper or hammer die is shown to have a portion cut away to fit down over the projection $1^b$.

In practice by repeated turnings of the link in the lower die and preferably reducing the strength of the blow of the hammer-die a practically cylindric shape (in cross-section) free from fins can be imparted to the link-bar.

A further advantage in making the lower die-groove of approximately two-thirds the depth of the link-bar is that the link is much more easily removed and without danger of disfiguring the link, this, too, while preserving the advantage which a deep groove has in shaping a link.

It will be particularly observed that because the sum of the depths in the grooves in the anvil and hammer dies is less than the diameter of the link-bar and because of the surface $2^b$, between the grooves $2^a$ the hammer-die cannot enter the anvil-die, and there can be no damage by way of finning, cutting, or otherwise disfiguring a link at any point.

What I claim, and desire to secure by Letters Patent, is—

1. A chain-link welding and shaping anvil-die block having a U-shaped welding and shaping groove of a depth approximately two-thirds the diameter of the link-bar, the surface between the arms of said groove coinciding with the surface of the die-block proper outside said arms combined with a hammer-die block having a shallow groove $2^a$ of corresponding shape and curve in cross-section but of a depth less than one-third the diameter of the link, and the surface $2^b$ between the arms of the groove $2^a$ in a plane coinciding with the outer edges of the groove, substantially as shown and described.

2. A chain-link welding and shaping anvil-die block having a U-shaped welding and shaping groove of a depth approximately two-thirds the diameter of the link-bar, the surface between the arms of said groove coinciding with the surface of the die-block proper outside said arms and the projection $1^b$ rising at the outer side of said groove having a vertical side tangent with the side of the groove, combined with a hammer-die block having a shallow groove $2^a$ of corresponding shape and curve in cross-section but of a depth less than one-third the diameter of the link-bar and the surface $2^b$ between the arms of the groove $2^a$ lying in a plane coinciding with the outer edges of the groove, substantially as described.

In testimony whereof I affix my signature in presence of two witnesses.

WILLIAM N. GOURLEY.

Witnesses:
E. O. RICKETT,
BENJ. FINCKEL.